United States Patent
Brewington et al.

[11] Patent Number: 6,070,706
[45] Date of Patent: Jun. 6, 2000

[54] DOUBLE ACTING ROLLER/BALL CLUTCH GEAR

[75] Inventors: James Gabriel Brewington; Richard Hunter Harris; Jeff David Thomas, all of Raleigh, N.C.

[73] Assignee: International Business Machines Corporation, Armonk, N.Y.

[21] Appl. No.: 09/243,591

[22] Filed: Feb. 3, 1999

[51] Int. Cl.[7] .............................. F16D 11/02; F16D 27/01
[52] U.S. Cl. ................ 192/27; 192/38; 192/84.3
[58] Field of Search ................... 192/27, 31, 38, 192/33 R, 45, 44, 84.3, 47; 400/621

[56] References Cited

U.S. PATENT DOCUMENTS

| | | | |
|---|---|---|---|
| 1,836,450 | 12/1931 | Colyer | 192/27 |
| 2,038,084 | 4/1936 | Racklyeft | 192/27 |
| 2,300,223 | 10/1942 | Hottenroth | 192/84.3 X |
| 3,369,638 | 2/1968 | Hunt et al. | 192/38 |
| 3,476,226 | 11/1969 | Massey | 192/27 |
| 3,648,813 | 3/1972 | Walters et al. | 192/38 X |
| 3,854,560 | 12/1974 | Nishikawa et al. | 192/27 |
| 4,050,692 | 9/1977 | Marass | 192/27 X |
| 4,852,707 | 8/1989 | Ito et al. | 194/44 |
| 5,307,911 | 5/1994 | Robinson | 192/31 |
| 5,413,426 | 5/1995 | Ijuin et al. | 400/621 |
| 5,482,389 | 1/1996 | Bickoff et al. | 400/621 |
| 5,713,405 | 2/1998 | Kashiwagi | 192/84.3 X |
| 5,743,350 | 4/1998 | Yamawaki et al. | 192/38 X |

*Primary Examiner*—Rodney H. Bonck
*Attorney, Agent, or Firm*—John D Flynn

[57] ABSTRACT

A gear mechanism containing a clutch assembly made of an outer member and an inner member wherein the rotation of the inner member is less than one revolution. The inner member has a chord surface, and when inserted in the outer member a wedge shaped space is created. Rolling elements are mounted in the wedge shaped space such that when there is rotation of one of the members, the rolling elements are driven into one of the corners of the wedge shaped space causing the inner member to rotate with the outer member. A protrusion at a fixed location is used to dislodge the rollers. With the rollers dislodged, the inner member ceases rotation. Four embodiments are disclosed. In the first embodiment, two magnetic rollers are used to provide an engagement mechanism between the rollers and the corner of the wedge shape. The second embodiment discloses a single magnetized roller. The third embodiment discloses a spring separator positioned perpendicular to the chord to position two non-magnetic rollers. The fourth embodiment uses a spring separator position parallel to the chord to position two non-magnetic rollers. In applications where, in one direction, a rotation of less than one revolution is acceptable, the use of a fixed protrusion to dislodge the rollers allows the full torque of the driving member to drive the mechanism in either rotational direction.

22 Claims, 6 Drawing Sheets

Clutch Gear 103

Clutch Gear 103

DOUBLE ACTING ROLLER/BALL CLUTCH GEAR

TECHNICAL FIELD

The invention relates in general to geared drive systems, and in particular to geared drive systems that rely on clutch mechanisms to reverse the rotation of gear systems.

BACKGROUND INFORMATION

It is common to use a motor to perform more than one function by reversing its rotational output direction. Two-way roller clutches are commonly used to shift between functions in gear systems. In the automobile industry, there are many available wherein a roller forms a rocking wedge between the driven and drive shafts to drive a driven element in a selected direction. U.S. Pat. No. 5,307,911 issued May. 3, 1994 to Robinson describes a two-way clutch mechanism that shifts from driving one direction to driving an opposite direction using pairs of rolling members wedged into position by a spring. U.S. Pat. No. 4,852,707 issued Aug. 1, 1989 to Kenichiro describes a clutch for use with an electric power steering assembly with an outer member, and a cage mounted between an outer member and inner members. These clutch mechanisms are for use in mechanisms requiring multiple revolutions of the clutch or drive mechanisms. Thus, they are overly complex and expensive for use with mechanisms where the rotation is restricted to less than one revolution such as a gear system for a cutter blade in a continuous roll printer.

In a continuous-roll printer or facsimile machine, a stepper motor usually performs two functions. When the motor turns in a forward direction, a geared system unwinds paper from the paper roll and advances it so that printing can occur. When the motor turns in the reverse direction, another gear drive system engages a cutter blade to cut the printed paper from the roll. Using the same motor both for feeding paper through the printer and cutting the printed paper is economical. In the printer example described above, a simpler clutch is typically used, such as a wrap spring slip clutch with an overrunning torque, hereinafter referred to as a slip clutch. A slip clutch typically connects the gear drive system and the cutter blade. Slip clutches are used to transmit power in one direction of rotation only (called the "locking rotation") and include teeth, ratchet or spring mechanisms that lock a driven part to a driving part when the driven part is turned in the locking direction. When the rotation of the driving part is reversed, the mechanism releases, causing the driven part to stop turning while the driving part continues to turn, or "overrun" the driven part.

Some slip clutches are designed with an "overrunning torque" or a mechanism that will not automatically release during reverse rotation. A slip clutch with an overrunning torque will transmit torque from the driven part to the driving part even in the reverse direction, but will slip if the torque required to drive the driven part exceeds the overrunning torque.

As an example, consider a slip clutch with an overrunning torque of 1 inch-ounce. This slip clutch will lock if driven in its locking rotation, transmitting rotation of the driving part to the driven part without slippage. In the reverse rotation, the clutch will slip if the load on the driven part exceeds 1 inch-ounce. Causing the clutch to slip, however, requires an amount of torque equal to the overrunning torque as a friction loss. In other words, a drive motor generating 10 inch-ounces of torque in the reverse direction through a clutch that is slipping wastes 1 inch-ounce of torque that is required to cause the clutch to slip. The effective torque of the motor is thereby reduced to 9 inch-ounces.

The slip clutch is configured so that a reverse rotation of the stepper motor causes a locking, or forward rotation of the slip clutch. When the stepper motor and gear drive are driven in reverse, the slip clutch locks, engaging the cutter blade to slice off a piece of paper. Afterwards, the stepper motor resumes its forward rotation, causing the slip clutch to turn in reverse. The clutch, however, will not release until the torque required to continue turning the driven part exceeds the overrunning torque. Therefore, the cutter blade will be lifted, as the slip clutch is designed to have an overrunning torque greater than the torque required to lift the cutting blade out of the paper path. The cutter blade continues to lift until it reaches a stop or limit mechanism, preventing further rotation, greatly increasing the torque required to lift the blade, and causing the slip clutch to release.

Even after the blade is lifted and the clutch released the stepper motor must continue to expend energy overcoming the overrunning torque so the blade will not fall back into the paper path. The overrunning torque of the slip clutch is high compared to normal wrap spring clutches because the overrunning torque must be high enough to reliably open the cutter blades. Furthermore, the torque required to open the cutter blade is limited to the overrunning torque. This results in friction loss, is a waste of energy, and increases the cost of the printer because a larger stepper motor must be specified than is required to drive paper through the paper path for printing. Additionally, it is rare that a slip clutch has a constant overrunning torque during its lifetime because environmental conditions, wear, and age modify the behavior of the clutch over time. If the overrunning torque becomes too high, paper will not feed properly because too much of the stepper motor's torque is wasted overcoming the friction generated by the overrunning torque. If the overrunning torque becomes too low, the cutter blade will not open or may slip back down into the paper path during printing.

What is needed, therefore, is a device which economically allows a gear system to transmit the full torque of a stepper motor in one direction, then at a predetermined stop position to disengage and allow the full torque of the stepper motor to be transmitted in the reverse rotation of the stepper motor.

SUMMARY OF THE INVENTION

The previously mentioned needs are fulfilled with the principle of the present invention. In a general sense, the present invention relates to a clutch mechanism comprising an outer member and an inner member wherein the rotation of the inner member is less than one revolution. Accordingly, there is provided, a clutch apparatus comprising an outer cylindrical member with a hub and an inner member having a chord at its periphery such that when the inner member is placed in the outer member a wedge shaped space is created. Rolling elements are mounted in the wedge like space such that when there is rotation of one of the members, the rolling elements are driven into one of the corners of the wedge shaped space creating a transference of rotational forces between the inner member and the outer member. At a particular fixed radial position, a fixed protrusion is used to dislodge the rollers such that no forces are transferred between the outer and inner members. Thus, at a predefined fixed rotational position, the inner member remains stationary with respect to the rotating outer member. When the motor is reversed, the inner member will again rotate with the outer member until the rollers encounters the other end of the stop protrusion (less than one revolution). Again the roller will dislodge the roller causing the inner member to remain stationary. Upon another motor reversal, the inner roller will rotate with the outer member until the inner roller reaches the fixed radial position (less than one revolution). At that time, one roller again encounters the protrusion, dislodging the roller such that no forces are transmitted and the inner member remains stationary.

In order to engage the walls of the wedge space, the rolling elements should be kept positioned next to the corners of the wedge shaped space. In a first embodiment of the present invention, two rollers are positioned by the use of magnetized rollers and an outer member made of Ferro magnetic material. A second embodiment uses a single magnetized roller and an outer member made of Ferro magnetic material. A third embodiment uses a spring separator positioned perpendicular to the chord to position two non-magnetic rollers. A fourth embodiment uses a spring separator position parallel to the chord to position two non-magnetic rollers.

In applications where, in one direction, a rotation of less than one revolution is acceptable, the use of a fixed protrusion to dislodge the rollers is simpler and more cost effective than that found in previous solutions. Previous solutions found in related art focused on continuous revolutions in both rotational directions. As such, they use a more complex and expensive clutch mechanism to dislodge rollers.

When a gear is added to the periphery of the outer member and a pin is added close to the periphery of the inner member, the roller clutch gear is ideally suited to drive a blade to cut paper in a continuous roll printer. In a printer application, the cutter gear can be fully disengaged from the drive gear when paper is fed and the pin is stationary. When the rotation is reversed, the full torque of the motor can be applied to rotate the pin and consequently to move the cutter blade in both directions to open and close the cutter blade.

These and other features, and advantages, will be more clearly understood from the following detailed description taken in conjunction with the accompanying drawings. It is important to note the drawings are not intended to represent the only form of the invention.

BRIEF DESCRIPTION OF THE DRAWINGS

For a more complete understanding of the present invention, and the advantages thereof, reference is now made to the following descriptions taken in conjunct with the accompanying drawings, in which.

DETAILED DESCRIPTION OF THE INVENTION

The principles of the present invention and their advantages are best understood by referring to the illustrated embodiment depicted in FIGS. 1–6 of the drawings, in which like numbers designate like parts. In the following description, well-known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding control circuitry or mechanisms used to control the rotation of the various elements described herein are omitted, as such control circuits are within the skills of persons of ordinary skill in the relevant art.

Figure 1:
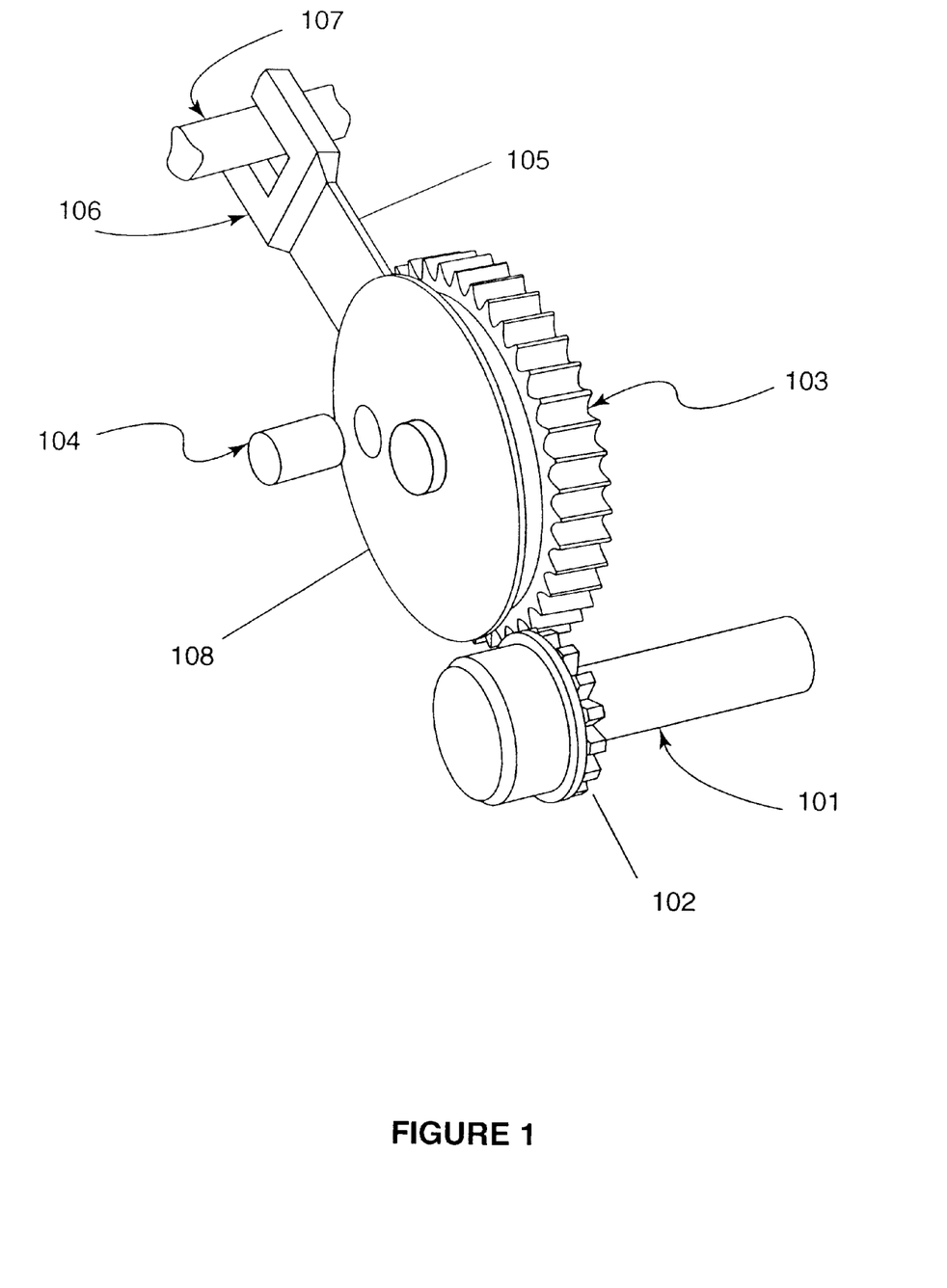
FIG. 1 is an isometric view of one embodiment of the present invention.

In FIG. 1, rotation and torque from a power source such as a stepper motor 202 (see FIG. 2) is transmitted by gearing 211 (see FIG. 2) to drive shaft 101 (partially shown). Drive shaft 101 is fixedly attached to fixed gear 102. Fixed gear 102 has gear teeth around its perimeter designed to mesh with and drive the gear teeth of clutch gear 103. In this example of the embodiment of the present invention, pin 104 is attached to inner race 303 of clutch gear 103 (see FIGS. 3 to 7). Pin 104 extends through dust shield 108 at a point near dust shield 108's perimeter. Stop 105 is partially shown protruding from clutch gear 103 and connected by stop bushing 106 to stationary shaft 107 that is fixed to the machine or printer frame.

Figure 2:
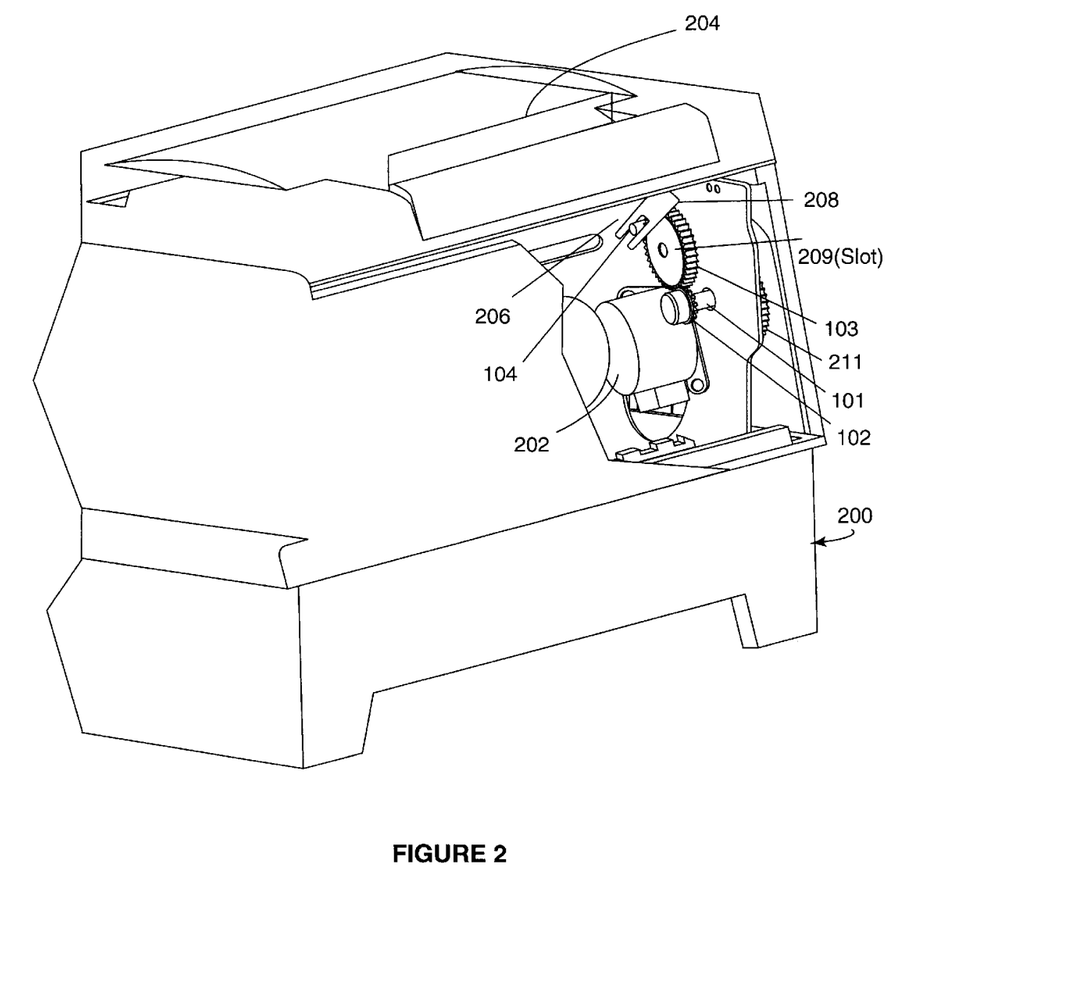
FIG. 2 is an isometric view of the embodiment of FIG. 1 shown as used in a printer.

FIG. 2 illustrates an embodiment of the present invention in a continuous roll printer. A portion of the wall of printer 200 has been removed to illustrate interior detail and a portion of the elements of the present invention. Printer 200 comprises drive motor 202 which is used to feed paper 204 from a paper roll (not illustrated) along a paper path (not illustrated) for printing by a print head (not illustrated). The paper roll is stored inside printer 200. The portion of paper 204 visible in FIG. 2 has been printed and is in a position to be cut off by cutter blade 206. Cutter blade 206 is attached to cutter blade bracket 208. Cutter blade bracket 208 comprises a slot 209. Rotation and torque from motor 202 is transmitted by gearing 211 (only a portion of gearing 211 is visible) to fixed gear 102.

When printing occurs, motor 202 transmits torque through gearing 211 and drive shaft 101 to fixed gear 102. Fixed gear 102 turns the gear teeth of clutch gear 103. However, pin 104 remains stationary as clutch gear 103 rotates. When printing is complete and the paper is to be cut, motor 202 reverses the rotation of drive shaft 101 and fixed gear 102 which causes clutch gear 103 to rotate in the opposite direction. Pin 104 is now carried by clutch gear 103 as clutch gear 103 rotates in the reverse direction. Pin 104 engages slot 209, so that rotation of clutch gear 103 causes pin 104 to rotate cutter blade bracket 208 such that cutter blade 206 rotates a cut edge (not illustrated) across the paper path in a cutting motion.

Drive motor 202 is preferably a stepper motor, although any power source that provides a controlled rotation may be used.

Printer 200 in FIG. 2 is only one embodiment of the present invention. Other embodiments may include fax machines having a cutter blade, a printer that uses a knife or cutter blade to cut a printed portion of paper away from a roll of paper, and the like.

Description of a First Embodiment

Figure 3:
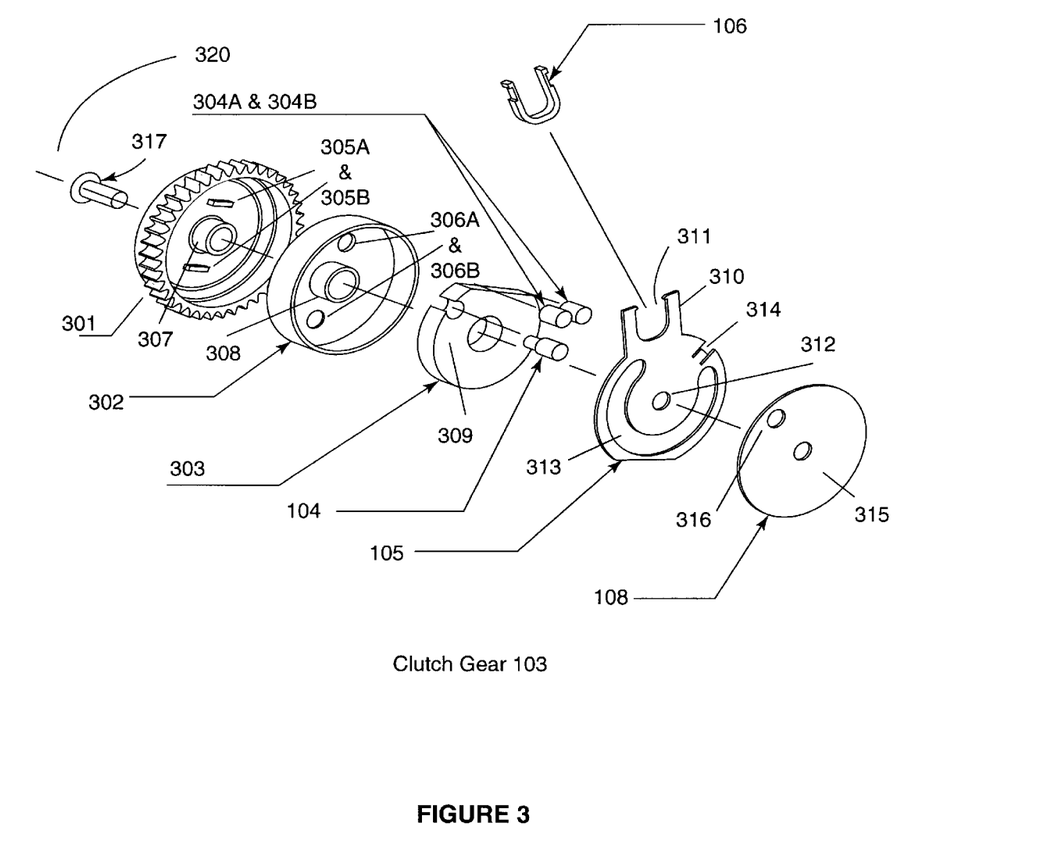
FIG. 3 is an exploded isometric view illustrating the embodiment of FIG. 1.

FIG. 3 is an exploded view of a first embodiment of the present invention showing clutch gear 103. Clutch gear 103 comprises an outer gear 301, an outer race 302, an inner race 303, pin 104, rollers 304A and 304B, stop 105, stop bushing 106, and dust shield 108. Outer gear 301, outer race 302, inner race 303, stop 105, and dust shield 108 are all concentric and have substantially identical rotational axes which is the center or rotational axis of stationary shaft 317. Outer gear 301 has nonelastic gear teeth around its periphery which are sized and spaced to mesh with and be driven by the gear teeth of fixed gear 102 (not shown). Outer gear 301 has an interior cylindrical inner surface, one end of which is open. The closed end of outer gear 301 has protrusions 305A and 305B. Cylindrical shaped hub 307 protrudes from the closed end of outer gear 301. Hub 307 has a cylindrical inner surface which rotates around and is supported by stationary shaft 317. Stationary shaft 317 is fixed to the machine or printer frame. Outer gear 301 surrounds outer race 302 which is a closed end cylinder of a diameter slightly smaller than the interior cylindrical diameter of outer gear 301. Protrusions 305A and 305B fit into openings 306A and 306B in the closed end of outer race 302 such that outer race 302 rotates when outer gear 301 rotates. Protruding from the closed end of outer race 302 is a cylindrical hub 308 which has an interior diameter slightly larger than the exterior diameter of hub 307 so that hub 307 can fit inside hub 308 and hub 308 can freely rotate when mounted on hub 307.

Inner race 303 is a thick walled cylinder having an exterior diameter slightly smaller than the interior diameter of outer race 302 and an interior diameter slightly larger than the outer diameter of hub 308 such that inner race 303 can easily rotate with respect to and when placed inside of outer race 302. At inner race 303's periphery is a cylindrical opening 309 having a longitudinal axis substantially parallel to the rotational axis of inner race 303. The diameter of cylinder opening 309 is slightly smaller than the diameter of pin 104 such that pin 104 can be pressed into cylinder opening 309. At another location on inner race 303's periphery is a flat surface or chord to inner race 303's axis of rotation such that when inner race 303 is placed inside of outer race 302 a semi-circular wedged shape space is formed. Rollers 304A and 304B fit inside the semi-circular wedge shape space.

Stop 105 is a circular plate with a protruding arm 310 which has a slot 311 centered on its free end. Stop bushing 106 fits into slot 311. Stop bushing 106 engages a stationary shaft 107 that is fixed to the machine or printer frame preventing stop 105 from rotating about its rotational axis. At the center of stop 105 is circular opening 312 which allows stationary shaft 317 to pass through stop 105. Curved slot 313 is near stop 105's periphery. Slot 313's midline is an arc with a radial center point located substantially at rotational axis 320. Slot 313's radial width is slightly larger than pin 104's exterior diameter such that pin 104 does not contact the sides of slot 313. Slot 313 allows pin 104 to move about rotational axis 320, within the length of slot 313. Pin 104 does not engage the ends of slot 313 because this would stall or stop pin 104's rotation. The length of slot 313 must be longer than pin 104's required movement about rotational axis 320. For example, the greater the arc required to drive the cutter blade in a printer, the greater the length of slot 313. Stop protrusion 314 is near stop 105 periphery such that it protrudes into the semi-circular wedge shaped space 402 (see FIG. 4) created by the encasement of inner race 303 by outer race 302.

Figure 8:
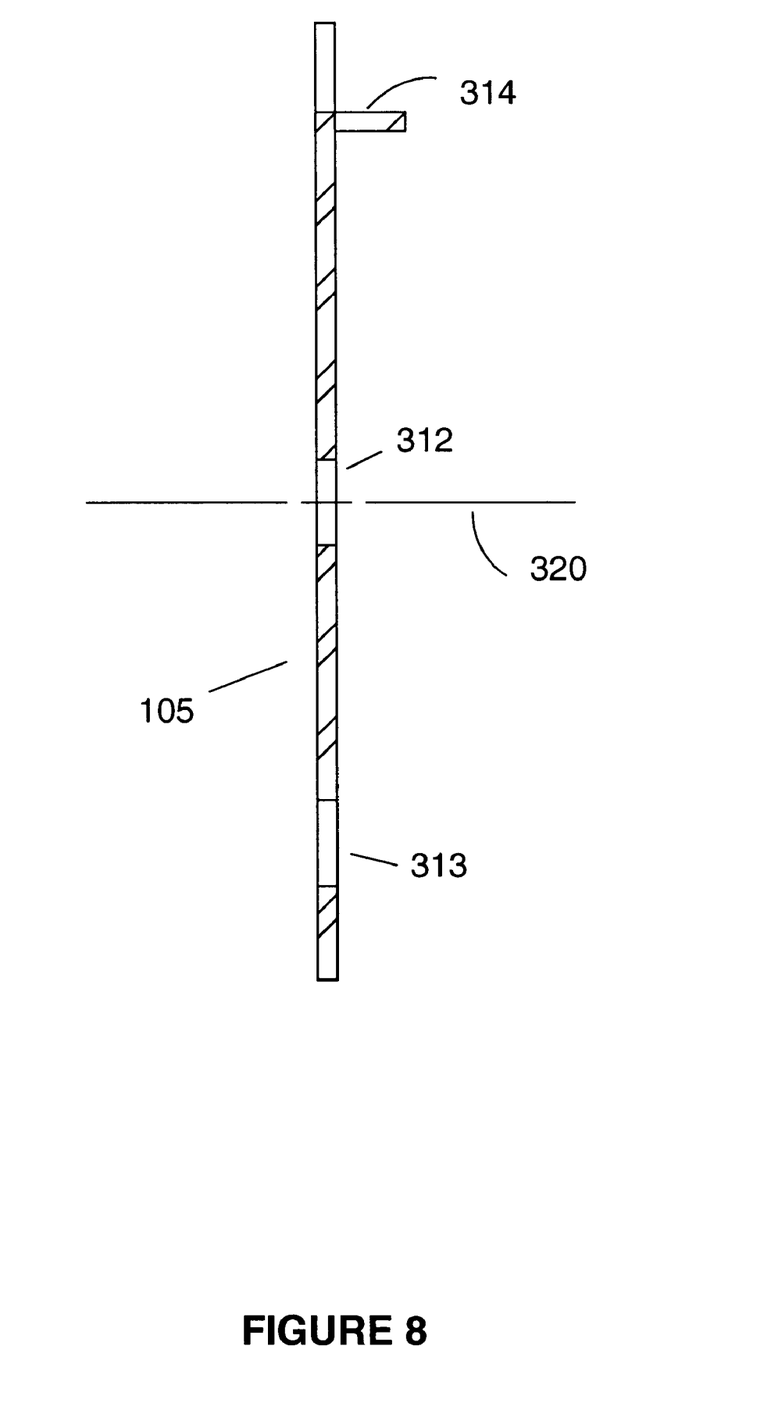
FIG. 8 is a transverse cross section view of the dust stop which is a part common to all of the disclosed embodiments of the present invention.

FIG. 8 is a transverse cross-section view of stop 105 cut through stop protrusion 314 to show that stop protrusion 314 is bent out of plane at approximately a 90 degree angle. Circular opening 312 of stop 105 is shown centered about rotational axis 320. Slot 313 is also shown.

Dust shield 108 is a circular plate with a circular opening 315 at its center to allow stationary shaft 317 to pass through dust shield 108 such that dust shield 108 is held in place longitudinally, but is free to rotate about its longitudinal axis. Near dust shield 108's periphery is circular opening 316 which allows pin 104 to protrude from dust shield 108.

Figure 4:
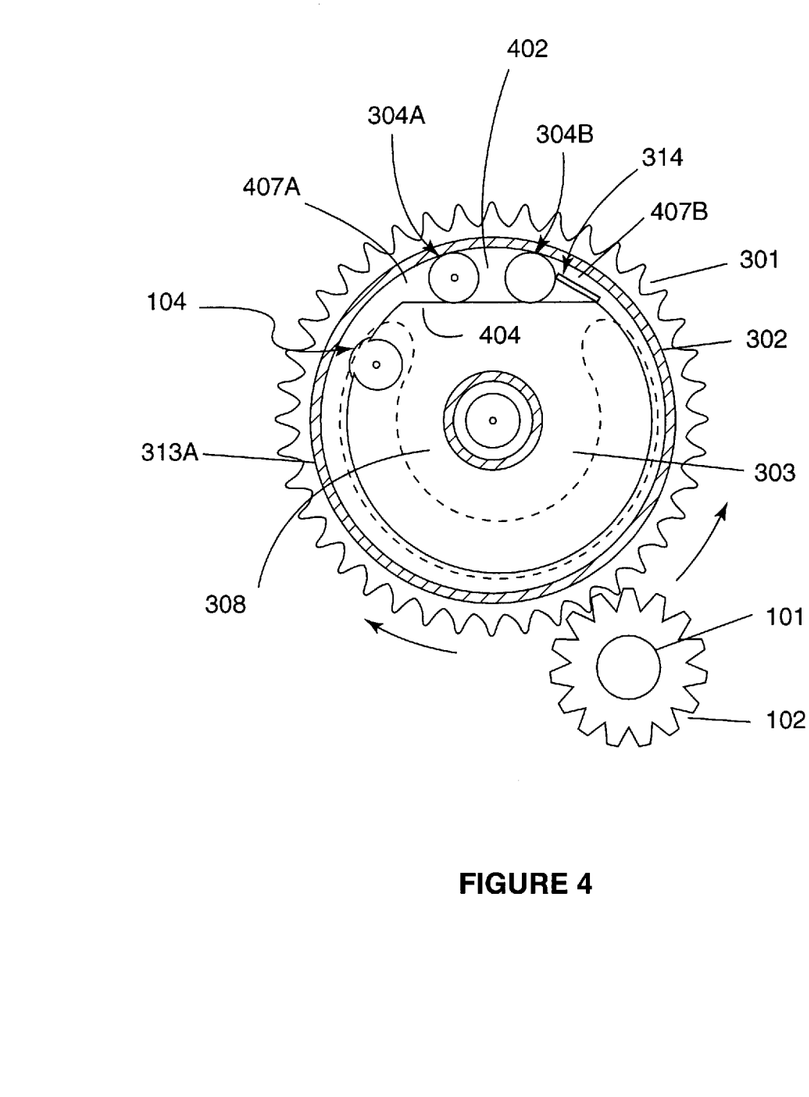
FIG. 4 is a transverse cross-section view of a first embodiment of the invention.

The first embodiment is further illustrated in FIG. 4 which is a transverse section view of the embodiment in FIG. 1 and FIG. 3. In this embodiment, fixed gear 102 is fixed to drive shaft 101. The teeth of fixed gear 102 are engaged with the teeth of outer gear 301. Outer gear 301 is rotationally fixed to steel outer race 302. Inner race 303 is made of stainless steel and rotates about hub 308 of outer race 302. A flat surface or chord 404 to inner race 303's axis of rotation creates semi-circular wedge shape space 402 with the inner surface of outer race 302.

Cylindrical rollers 304A and 304B fit inside of space 402. Space 402 has two wedges or corners 407A and 407B. The diameter of each roller 304A and 304B is greater than the radial spacing between the inner surface of outer race 302 and the radial extremities at the ends of the space 402 such that the rollers 304A and 304B are wedged between chord 404 and the inner surface of outer race 302. The diameters are less than the distance between the radial spacing between the inner surface of outer race 302 and chord 404 such that rollers 304A and 304B fit loosely in space 402. Rollers 304A and 304B are magnetized so that they adhere to steel outer race 302, but not the non-magnetic inner race 303. Rollers 304A and 304B are assembled so that their magnetic forces repel. This magnetic action ensures that Rollers move with the outer race 302 and wedge reliably between outer race 302 and inner race 303 to create a locking condition. Protrusion 314 is also shown near the corner 407B created by chord 404 and the inner surface of outer race 302. Protrusion 314 engages the rollers when inner race 303 is in the desired stopped position.

Pin 104 is shown on the perimeter of inner race 303. Pin 104's circular movement around rotational axis 320 is restricted when protrusion 314 engages either roller 304A or roller 304B. The outline of slot 313 or path formed by slot 313 is shown in dotted lines as path 313A.

Description of a Second Embodiment

Figure 5:
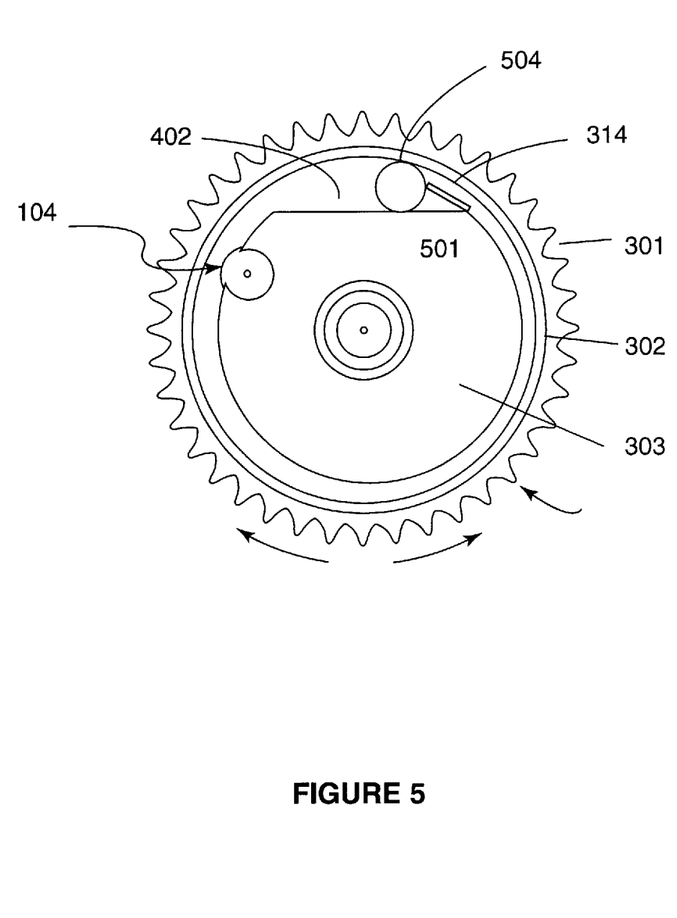
FIG. 5 is a transverse cross section view of a second embodiment of the present invention.

A second embodiment is illustrated in FIG. 5 which is a transverse section view of the embodiment in FIG. 1. The second embodiment is similar to the first embodiment except for a single roller 504 in place of rollers 304A and 304B.

For brevity and clarity, a description of those parts which are identical or similar to those described in connection with the first embodiment illustrated in FIGS. 3 and 4 will not be repeated here. Reference should be made to the foregoing paragraphs with the following description to arrive at a complete understanding of this second embodiment.

Roller 504 is a cylindrical roller with a diameter greater than the radial spacing between the inner surface of outer race 302 and the radial extremities at the ends of the space 402 so that roller 504 can be wedged between chord 404 and inner race 303 and the inner surface of outer race 302. The diameter is less than the distance between the radial spacing between the inner surface of outer race 302 and center point 501 of chord 404 such that roller 504 fit loosely in space 402. Roller 504 is magnetized so that it adheres to steel outer race 302, but not to the non-magnetic inner race 303.

Description of a Third Embodiment

Figure 6:
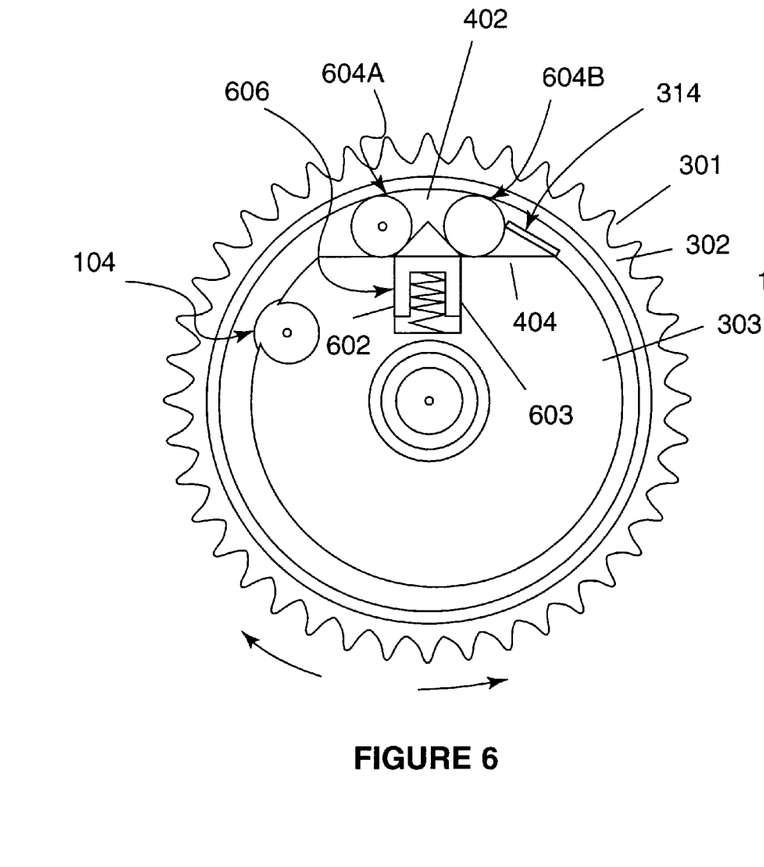
FIG. 6 is a transverse cross section view of a third embodiment of the present invention.

A third embodiment is illustrated in FIG. 6 which is a transverse section view of the embodiment in FIG. 1. The third embodiment is similar to the first embodiment except that it uses a spring separator and does not require magnetic rollers.

For brevity and clarity, a description of those parts which are identical or similar to those described in connection with the first embodiment illustrated in FIGS. 3 and 4 will not be repeated here. Reference should be made to the foregoing paragraphs with the following description to arrive at a complete understanding of this third embodiment.

In this embodiment, inner race 303 contains a circular cavity 602. Circular cavity 602 houses a compressed helical coil spring 604. Helical coil spring is positioned so that it exerts a constant force on separator 606. Separator 606 is a cylinder with one closed end. The exterior diameter of separator 606 is smaller than the diameter of cavity 602. The inner diameter of separator 606 is larger than the outer diameter of the coil of spring 603 such that the cylindrical walls of separator 606 fit loosely between the inner surface of cavity 602 and encases most of spring 603. The exterior of closed end of separator 606 is shaped so that it can separate non-magnetic rollers 604A and 604B.

The compression of coil spring 603 exerts enough force on separator 606 to keep rollers 604A and 604B separated, but not enough to create significant frictional forces between the surface of the rollers and the exterior surface of separator 606. The diameter of each roller 604A and 604B is greater than the radial spacing between the inner surface of outer race 302 and the radial extremities at the corners 407A and 407B so that the rollers 604A and 604B are wedged between the chord 404 and the inner surface of outer race 302. The diameters are less than the distance between the radial spacing between the inner surface of outer race 302 and chord 404 such that rollers 604A and 604B fit loosely in space 402.

Description of a Fourth Embodiment

Figure 7:
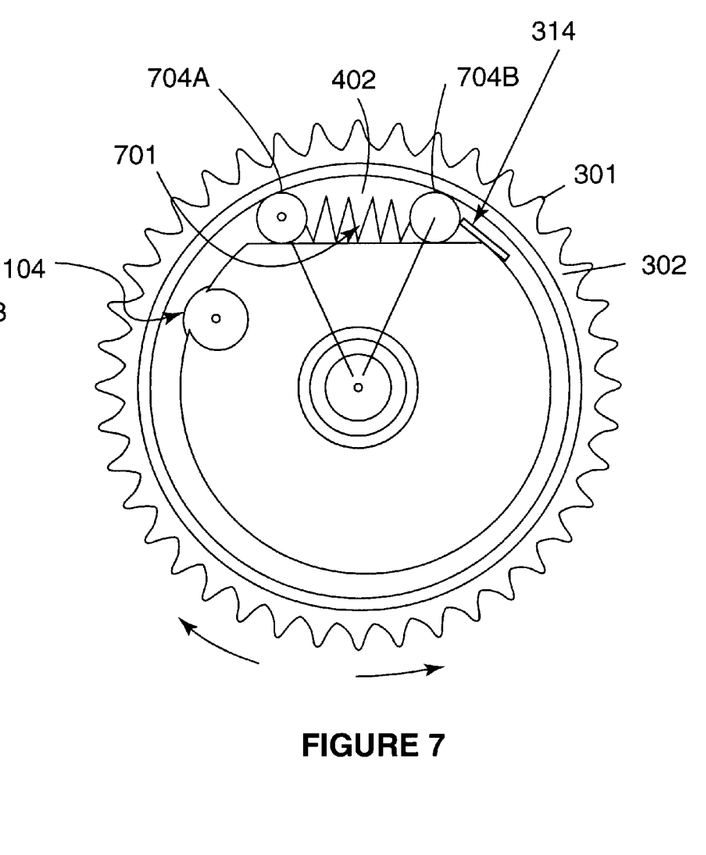
FIG. 7 is a transverse cross section view of a fourth embodiment of the present invention.

A fourth embodiment is illustrated in FIG. 7 which is a transverse section view of the embodiment in FIG. 1. The fourth embodiment is similar to the first embodiment except that it uses spheres instead of cylindrical rollers and a helical spring instead of magnetized rollers.

For brevity and clarity, a description of those parts which are identical or similar to those described in connection with the first embodiment illustrated in FIGS. 3 and 4 will not be repeated here. Reference should be made to the foregoing paragraphs with the following description to arrive at a complete understanding of this fourth embodiment.

In this embodiment, spherical rollers 704A and 704B fit inside of space 402. The diameter of each roller 704A and 704B is greater than the radial spacing between the inner surface of outer race 302 and the radial extremities at corners 407A and 407B so that the rollers 704A and 704B are wedged between the flat surface of inner race 303 and the inner surface of outer race 302. The diameters are less than the distance between the radial spacing between the inner surface of outer race 302 and chord 404 such that rollers 704A and 704B fit loosely in space 402. Rollers 704A and 704B are not magnetic. Protrusion 314 is also shown near the corner created by chord 404 and the inner surface of outer race 302. Protrusion 314 engages the rollers when inner race 303 is in the desired stopped position.

A helical spring 701 is compressed such that it exerts enough force on the surfaces of rollers 704A and 704B to keep the rollers separated, but not enough to create significant frictional forces between the surface of the rollers and the interior surface of outer race 302.

Operation

The manner of operation of each embodiment is similar. Referring to FIG. 4, when drive gear 102 begins to rotate counterclockwise, outer gear 301 begins to rotate clockwise causing outer race 302 to rotate clockwise because outer race 302 is fixed to outer gear 301. As outer race 302 rotates, roller 304B is driven into the corner 407B of space 402 created by chord 404 and inner surface 302 unless it can engage protrusion 314 of stop 105. If protrusion 314 is not engaged with roller 304B, roller 304B is wedged into corner 407B such that torque is transmitted from outer gear 301 through outer race 302 to inner race 303 causing inner race 303 to rotate with outer race 302. If roller 304B is engaged with protrusion 314, protrusion 314 forces roller 304B out of corner 407B such that substantially no torque is transmitted to inner race 303. Similarly, when motor 202 reverses, causing fixed gear 102 to rotate clockwise, outer gear 301 and consequently, outer race 302 rotates counterclockwise. As outer race 302 rotates, roller 304A is driven into the corner 407A of space 402 unless it can engage a protrusion on stop 105 (not shown). When stop 105 is not engaged with roller 304A, roller 304A is wedged into corner 407A such that torque is transmitted from outer gear 301 through outer race 302 to inner race 303 causing inner race 303 to rotate with outer race 302. When roller 304A is engaged with a protrusion on stop 105 (not shown), the protrusion forces roller 304A out of corner 407A such that substantially no torque is transmitted to inner race 303.

The printer example shall be used to further illustrate the operation of this embodiment of the present invention. When the printer is feeding paper, drive gear 102 turns counterclockwise causing outer gear 301 to turn clockwise. Pin 104 is near one end of slot 313 on stop 105. Roller 304B is engaged with protrusion 314 such that no or little torque is transmitted to inner race 303. Outer gear 301, therefore, can move freely with respect to inner race 303 and pin 104 remains stationary.

When printing is completed and paper is to be cut by cutter blade 206, drive motor 202 (FIG. 2) reverses, causing gearing 211 to turn shaft 101 and fixed gear 102 clockwise (FIG. 4). Drive gear 102 then turns outer gear 301 in a counterclockwise rotation, thus disengaging protrusion 314 from roller 304B and consequently forcing roller 304A into corner 407A. The wedging of roller 304A into corner 407A transmits torque to inner race 303 such that it rotates and subsequently moves pin 104 around path 313A. Pin 104 rotates cutter blade bracket 208 such that cutter blade 206 begins to close. At this point in the cycle, full available torque can be transmitted from fixed gear 102 to outer gear 301. No power is lost overcoming an overrunning torque of a clutch as in past solutions and related art. A mechanism (not shown) such as another spring clutch or large backlash devise decouples the paper feed drive so that the paper is not feed backwards during the cut cycle. Such a spring clutch or backlash devise is familiar to those who practice the art of design continuous feed printers and fax machines.

After the paper has been cut, normal printing and paper feeding is continued. Consequently, drive motor 202 again reverses, resulting in a counterclockwise rotation of drive gear 102 and a clockwise rotation of outer gear 301. The reverse rotation releases roller 304A from corner 407A and causes roller 304B to be wedged into corner 407B. Torque is then transmitted to inner race 303, causing inner race 303 to rotate. The rotation of inner race 303 carries pin 104 in the reverse direction along path 313A until pin 104 approaches the end of slot 313. The end of slot 313 is positioned such that before pin 104 encounters the end of slot 313, protrusion 314 has engaged roller 304B, releasing 304B from wedged corner 407B. Thus, torque is no longer transmitted to inner race 303. Outer gear 301 is then free to rotate in a clockwise direction about axis 320 even though inner race 303 and pin 104 remain stationary.

Other embodiments described herein operate in a similar manner. The difference between the operation of the first embodiment and the second embodiment is that the second embodiment uses a single roller 504 instead of rollers 304A and 304B. The configuration of the second embodiment is simpler and more economical, but the backlash is considerably longer. Backlash is the angle needed to release the roller from one wedged corner and to engage the other wedged corner once rotation is reversed.

The third embodiment uses a spring configuration of spring 603 and spring separator 606 rather than magnetization to separate the rollers as in the first and second embodiments. Non magnetized rollers 604A and 604B replace 304A and 304B of the first embodiment. The spring configuration of the third embodiment is more complex and relatively expensive, but less backlash is created when the rollers 604A or 604B is released from being wedged into a corners 407A or 407B.

The fourth embodiment uses a spring parallel to chord 404 rather than magnetization to separate the rollers as in the first and second embodiments. The fourth embodiment also uses ball bearings 704A and 704B rather than cylindrical rollers 304A and 304B. The fourth embodiment uses spring 701 and a configuration that is slightly less complex and less expensive than the third embodiment, but the contact stresses are greater with ball bearings 704A and 704B and thus, will transmit less torque than the other embodiments.

Unlike the arrangements of the related art wherein the torque to perform a second function such as opening a cutter blade is limited by the slip torque of a slip clutch, all the available torque from drive gear 102 is applied to opening the cutting blade 206. The full torque is available in both the forward and reverse directions for the desired amount of rotation while disengaging the cutter blade when pin 104 is rotated back to its original position. As such, none of the drive motor energy is lost on overcoming the overrunning torque of a slip clutch or similar related art. In related art, the overrunning torque of slip clutch acts as a drag on the motor or power source and increases the size of the motor to overcome the torque resulting in a waste of energy. Additionally, as the slip clutch wears, the overrunning torque may decrease, which lessens the load on the motor, but tends to allow cutter blade to fall to open. Finally, the overrunning torque of related art may increase overtime, which will increase the load on the motor, decreasing the motor's ability to feed paper through the printer. With the present invention, there is minimal overrunning torque and consequently, no additional load on the motor. As such, the motor can be more efficient and reliable.

Although the invention has been described with reference to specific embodiments, these descriptions are not meant to be construed in a limiting sense. Various modifications of the disclosed embodiments, as well as alternative embodiments of the invention will become apparent to persons skilled in the art upon reference to the description of the invention. It is therefore, contemplated that the claims will cover any such modifications or embodiments that fall within the true scope of the invention.

What is claimed is:

1. A clutch apparatus comprising:

an outer member with an inner periphery surface;

an inner member having an outer periphery diameter less than the diameter of said inner periphery surface such that said inner member can be mounted in said outer member;

a wedge-like space defined by said inner peripheral surface of said outer member and outer peripheral surface of said inner member;

a rolling mechanism mounted in said wedge shaped space such that when rotation of either said inner member or said outer member occurs with respect to the other, said rolling mechanism engages with said surfaces of said wedge-like space such that driving forces are transferred between said outer member and said inner member;

a fixed protrusion mounted between said inner periphery surface of said outer member and outer periphery surface of said inner member such that when rotation occurs of either said inner member or said outer member and when said rolling element engaged with the surfaces of said wedge-like space encounters said fixed protrusion, said rolling element is disengaged from said surfaces of said wedge shaped space such that no driving force is transferred between said outer member and said inner member.

2. The apparatus of claim 1, wherein said inner member contains a chord forming surface at its periphery.

3. The apparatus of claim 2, wherein said inner member contains a bore perpendicular to a surface of said chord at approximately the center point of said chord.

4. The apparatus of claim 3, where said rolling mechanism comprises two substantially identical cylindrical rolling elements positioned by a closed end cylinder having a coned shaped surface on the exterior of said closed end and partially surrounding a compressed helical spring positioned in said bore of inner member.

5. The apparatus of claim 1, wherein said outer member consists of magnetic material.

6. The apparatus of claim 5, wherein said inner member consists of non-magnetic material.

7. The apparatus of claim 6, wherein said rolling mechanism comprises two magnetized cylindrical rolling elements.

8. The apparatus of claim 6, wherein said rolling mechanism comprises a single magnetized cylindrical rolling element.

9. The apparatus of claim 1, wherein said rolling mechanism comprises two ball bearings positioned by a compressed helical spring positioned substantially parallel to said chord surface of said inner member.

10. The apparatus of claim 1, wherein said outer member has a plurality of equally spaced teeth around its peripheral surface for meshing with a drive gear.

11. The apparatus of claim 1, wherein said fixed protrusion is rotationally fixed to a stationary shaft.

12. A gear system comprising:

a drive shaft connected to a drive gear;

a driven outer member with a plurality of equally spaced teeth for meshing with said drive gear and an inner periphery surface;

a center hub of said driven outer member mounted on a stationary member;

an inner member having an outer periphery diameter less than the diameter of said inner periphery surface and an inner diameter larger than the exterior diameter of said center hub such that said inner member can be mounted in said outer member and rotate about said hub of said outer member;

a chord forming surface at the periphery of said inner member creating a wedge-like space defined by said inner peripheral surface of said outer member and said chord forming surface of said inner member;

a rolling mechanism mounted in said wedge shaped space such that during rotation of said outer member, said rolling mechanism engages with said surfaces of said wedge-like space such that driving forces are transferred from said outer member to said inner member such that said inner member rotates with said outer member, and a fixed protrusion rotatably fixed to a stationary member and positioned between said inner periphery surface of said outer member and outer periphery surface of said inner member such that when said outer member is rotating, said fixed protrusion does not contact the inner periphery surface of said outer member or the outer periphery surface.

13. The apparatus of claim 12, wherein said outer member consists of magnetic material.

14. The apparatus of claim 13, wherein said inner member consists of non-magnetic material.

15. The apparatus of claim 14, wherein said rolling mechanism comprises two magnetized cylindrical rolling elements.

16. The apparatus of claim 14, wherein said rolling mechanism comprises a single magnetized cylindrical rolling element.

17. The apparatus of claim 12, wherein said inner member contains a bore perpendicular to said chord surface at approximately the center point of said chord surface.

18. The apparatus of claim 17, where said rolling mechanism comprises two cylindrical rolling elements positioned by a closed end cylinder having a coned shaped surface on the exterior of said closed end and partially surrounding a compressed helical spring positioned in said bore in chord surface of inner member.

19. The apparatus of claim 12, wherein said rolling mechanism comprises two ball bearings positioned by a compressed helical spring positioned substantially parallel to said chord surface of said inner member.

20. The apparatus of claim 12, wherein said inner member contains a pin located near its periphery and having a longitudinal axis parallel with said inner member's rotational axis.

21. The apparatus of claim 20, further comprising:

a cutter blade bracket having a slot into which said pin is inserted so that a circular movement of said pin rotates said pin in a slot so as to rotate said cutter blade bracket, a paper path; and a cutter blade, wherein rotation in a first rotational direction of said cutter blade bracket causes said cutter blade to move in a cutting motion across said paper path and wherein rotation in a second rotational direction of said cutter blade bracket causes said cutter blade bracket to return to original position out of the way of said paper path.

22. The gear system of claim 12 further comprising a stepper motor, wherein power to turn said drive gear is provided by said stepper motor.

* * * * *